Nov. 12, 1963   W. L. DENNIS   3,110,065
SEALING STRIP
Filed Dec. 4, 1961

INVENTOR.
William L. Dennis
BY
Herbert Furman
ATTORNEY

United States Patent Office 3,110,065
Patented Nov. 12, 1963

3,110,065
SEALING STRIP
William L. Dennis, Birmingham, Mich., assignor to General Motors Corporation, Detroit, Mich., a corporation of Delaware
Filed Dec. 4, 1961, Ser. No. 156,590
1 Claim. (Cl. 20—69)

This invention relates to sealing strips and more particularly to sealing strips for sealing vehicle body closures to vehicle body members.

The sealing strip of this invention is generally of the fluid displacement type and in its preferred embodiment includes a pair of adjacent interconnected fluid receiving recesses or reservoirs of different volumetric capacity. The strip includes a base and an elastomeric web overlying the base portion and joined to the side edges thereof, adjacent longitudinally extending web portions and respective base portions defining the adjacent recesses. When the closure member is moved to closed position, a wall thereof engages the web portion of the recess of greater volumetric capacity to deflect this web portion toward its respective base portion and displace or force the fluid from this one recess or reservoir into the other recess or reservoir to cause the other web portion thereof to be deflected away from its respective base portion and into sealing engagement within a recess provided in the wall of the closure. Sealing ribs provided on the other web portion engage the recess wall to ensure a continuous tight seal between the closure member wall and recess and the body member.

The sealing strip is intended to be continuous around the opening which is closed by the closure member and since no fluid, such as air or otherwise, is lost when the closure member is opened and closed, the sealing strip of this invention will have a long useful life.

The primary object of this invention is to provide a new and improved sealing strip. Another object of this invention is to provide a new and improved sealing strip of the fluid displacement type. A more specific object of this invention is to provide a new and improved sealing strip which includes adjacent fluid receiving reservoirs of different volumetric capacity, with one of the reservoirs adapted to be deflated so as to inflate the adjacent reservoir beyond its normal capacity and cause a flexible wall thereof to be deflected into sealing engagement with a member to be sealed.

These and other objects of the invention will be readily apparent from the following specification and drawings wherein.

Figure 1:
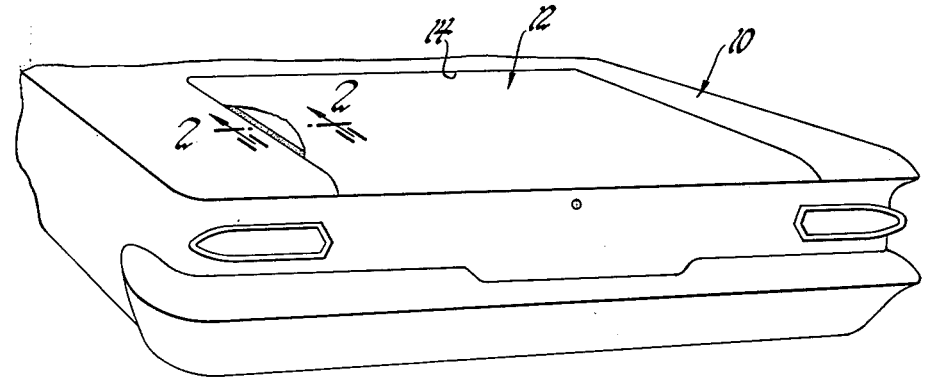
FIGURE 1 is a partial rear perspective view of a vehicle body having a closure mounted thereon for movement between opened and closed positions and sealed in the closed position thereof by a sealing strip according to this invention.
Figure 2:
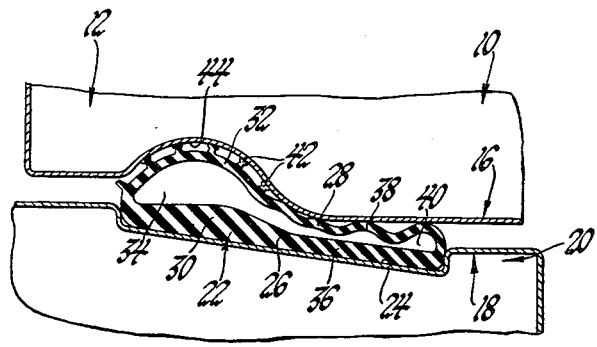
FIGURE 2 is an enlarged sectional view taken generally along the plane indicated by line 2—2 of FIGURE 1, showing one embodiment of this invention, with the sealing strip being shown when the closure is in a closed position.

Referring now particularly to FIGURE 1 of the drawings, a vehicle body 10 includes a deck lid 12 which is swingably mounted adjacent its forward edge 14 on the body for movement between a closed position, as shown, and an open position, not shown. As shown in FIGURE 2, a wall 16 of the deck lid is adapted to be located in juxtaposed relationship to a wall 18 of a body member 20 when the deck lid is in its closed position. A sealing strip 22 according to one embodiment of this invention is mounted within a recess 24 of wall 18 in order to seal wall 18 to wall 16 when the closure member is in a closed position, as will be described.

Figure 3:
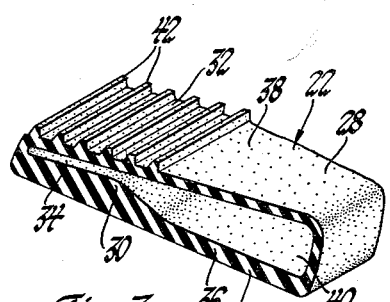
FIGURE 3 is a perspective view of the sealing strip of FIGURE 2 in its normal position.

As shown in FIGURES 2 and 3, the sealing strip 22 includes an elongated base 26 and a generally L-shaped elongated web or cover 28 which is joined to the side edge portions of the base 26. The base 26 is provided with a longitudinally extending rib 30 adjacent one edge thereof with rib 30 and one longitudinally extending portion 32 of web 28 defining a longitudinally extending fluid receiving recess or reservoir 34, and with the other portion 36 of the base and the respective portion 38 of the web 28 defining an adjacent longitudinally extending fluid receiving recess or reservoir 40. The web portion 32 is further provided with a plurality of longitudinally extending sealing ribs 42.

The sealing strip is shown in normal position in FIGURE 3 and it will be noted that in this position the volumetric capacity of recess 34 is substantially less than that of the recess 40. It is intended that the sealing strip be continuous around the opening in the body for the deck lid 12 and that it be filled with air or other suitable fluid so that a continuous closed loop chamber defined by the reservoirs 34 and 40 is provided within the strip.

When the deck lid 12 is moved to a closed position, the wall 16 will engage the web portion 38 and deflect this web portion toward its base portion 36, as shown in FIGURE 2, to force the fluid out of the recess or reservoir 40 into the adjacent recess or reservoir 34 and in turn force the web portion 32 outwardly or away from the rib 30 and force the sealing ribs 42 into tight sealing engagement with an arcuate cross section wall which defines a recess 44 within the wall 16 of the deck lid 12. It will be noted that the web portion 38 becomes rippled when deflected toward the base portion 46 and that the sealing engagement of web portion 38 with wall 16 provides an additional seal between walls 16 and 18.

As shown in FIGURE 3, the web 38 does not lie parallel to the base 26, and accordingly, when the sealing strip 22 is mounted within the recess 24, it is canted so that the web 38 will be parallel to the wall 16. This is done by canting the wall of the recess 24.

When the deck lid is thereafter moved to an open position, the web 28 will return to its normal position, as shown in FIGURE 3, as the fluid returns from the reservoir 34 to the reservoir 40.

Figure 5:
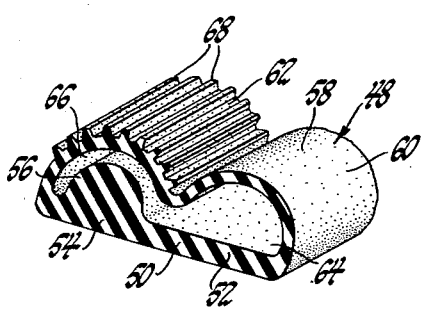
Figure 4:
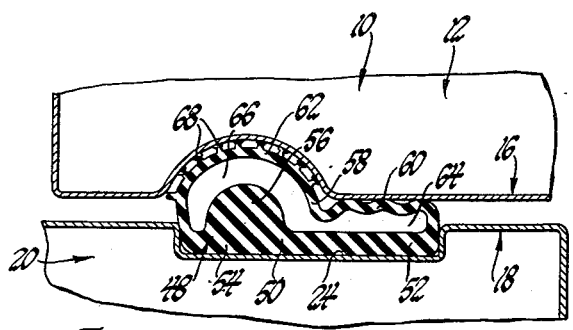
FIGURE 4 is a view similar to FIGURE 2 showing another embodiment of this invention; and, FIGURE 5 is a perspective view of the sealing strip of FIGURE 4 in its normal position.

FIGURES 4 and 5 show another embodiment of the invention which will now be described and like numerals will be used for like parts.

In this embodiment of the invention, the sealing strip 48 includes a base 50 having adjacent longitudinally extending base portions 52 and 54, with the base portion 54 being provided with a longitudinally extending rib 56 of acruate cross section. The web 58, which overlies the base 50 and is joined to the side edges thereof, includes adjacent longitudinally extending web portions 60 and 62, each being of arcuate cross section and defining with the respective base portions 52 and 54 adjacent longitudinally extending recesses or reservoirs 64 and 66. It will be noted that the web portion 62 is complementary in cross sectional shape to the rib 56 and that the outer surface of this web portion is provided with a plurality of adjacent longitudinally extending spaced sealing ribs 68.

The sealing strip 48 is adapted to be mounted on the body in substantially the same manner as the sealing strip 22, and accordingly, like numerals have been used for like parts of the body. It is believed that the operation of the sealing strip 48 will be obvious from the foregoing description of the operation of the sealing strip 22.

Thus, this invention provides a new and improved sealing strip.

What is claimed is:

In a vehicle body including a closure member movable between open and closed positions with respect to a body member, sealing means comprising, an elongated base mounted on said body member and including adjacent longitudinally extending portions, an elongated elastomeric web overlying said base and joined thereto to provide an elongated closed cell tubular sealing strip, said web including adjacent longitudinally extending portions respective to said base portions and defining adjacent fluid reservoirs therewith, a rib projecting from the inner surface of one of the said base portions to occupy substantially the entire cavity of the respective one of said reservoirs, a fluid received within said reservoirs, said closure member, upon movement thereof to said closed position, deflecting the web portion respective to said other reservoir toward its respective base portion to force the fluid contained in said other reservoir into said one reservoir to cause the web portion thereof to be deflected away from said rib and into a recess provided in said closure member, and rib means on the web portion of said one reservoir engageable with said closure in the recess thereof to provide sealing engagement between said closure and said web in the closed position of said closure.

References Cited in the file of this patent

UNITED STATES PATENTS

| | | |
|---|---|---|
| 2,139,329 | Fessler | Dec. 6, 1938 |
| 2,513,043 | Nofzinger | June 27, 1950 |
| 2,622,286 | Beck | Dec. 23, 1952 |
| 2,663,916 | Millman | Dec. 29, 1953 |
| 2,686,343 | Harpoothian | Aug. 17, 1954 |

OTHER REFERENCES

German application Serial No. B29,344, printed Sept. 6, 1956 (KL 37D GR24).